UNITED STATES PATENT OFFICE.

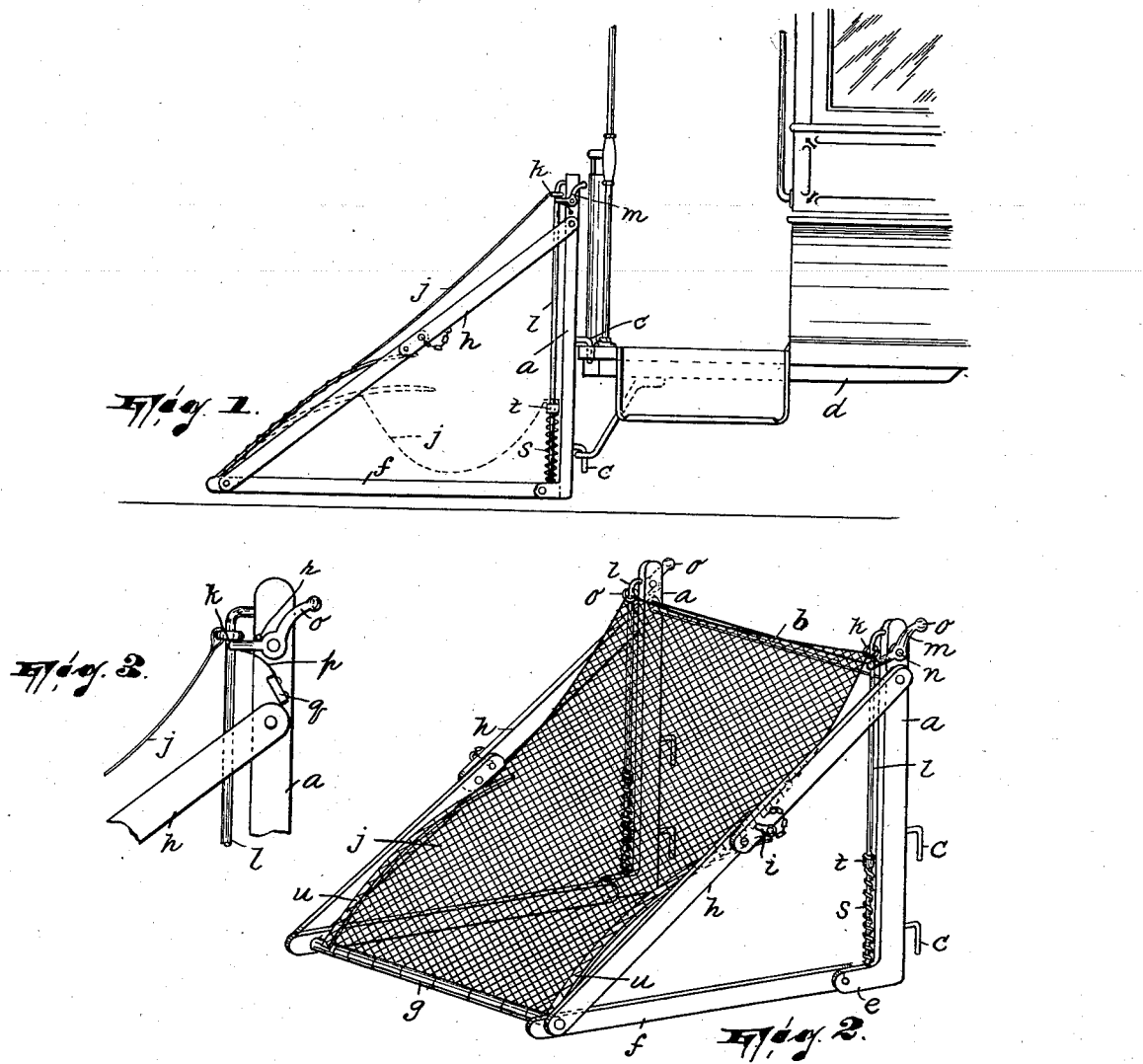

GEORGE D. SMITH, OF PATERSON, NEW JERSEY.

CAR-FENDER.

SPECIFICATION forming part of Letters Patent No. 654,854, dated July 31, 1900.

Application filed March 30, 1900. Serial No. 10,743. (No model.)

*To all whom it may concern:*

Be it known that I, GEORGE D. SMITH, a citizen of the United States, residing in Paterson, in the county of Passaic and State of New Jersey, have invented certain new and useful Improvements in Car-Fenders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide a car-fender having its net or other similar receptacle for catching the body picked up so arranged that under the weight of the body the net will freely fall or drop in the fender-frame. Where the net is fixed or is sustained upon cushioning-springs, according to constructions heretofore in use, there is the danger that the incident reaction of the net when a body falls into it, especially when in damp weather the net has shrunk so as to be more than ordinarily taut, will cause the body to rebound out or partially out of the net. It is to destroy this tendency toward reaction, and thus insure the body's remaining in the net after being picked up by the fender, that I construct the net, as above stated, so that it will drop or fall.

My invention consists in the improved car-fender and in the combination and arrangement of the various parts thereof, substantially as will be hereinafter pointed out and finally embodied in the clauses of the claim.

In the accompanying drawings, wherein corresponding letters of reference indicate like parts, Figure 1 shows the front portion of a car with my improved fender attached thereto. Fig. 2 is a perspective view of my improved fender; and Fig. 3 is an enlarged view in elevation of the upper portion of the fender, showing a certain detail of construction.

In said drawings, $a$ designates a pair of uprights, which are connected and braced at their upper ends by a cross-bar $b$ and each of which has a pair of hooks $c$, whereby it is secured to suitable supporting means upon the front portion of the car $d$. To arms $e$, projecting forwardly from the lower ends of the uprights, are pivoted rods $f$, the free ends of these arms being connected and braced by a cross-bar $g$. The ends of the cross-bars $g$ and $b$ protrude through the uprights $a$ and the rods $f$, and to their projecting ends are pivotally connected the ends of folding or jointed connecting-rods or side bars $h$. The side bars $h$ are maintained extended by means of removable pins $i$, which are adapted to penetrate the overlapping and pivoted ends of the members composing them.

$j$ designates the net. Said net may consist of wire, chain, or rope, as desired. It is preferably permanently secured or fixed to the cross-bar $g$ at its lower or forward end, while at its upper end at each corner is secured a ring or traveler $k$. Each of these rings or travelers is penetrated by a guide-rod $l$, which is secured to each upright and is parallel with the front face thereof.

$m$ designates latches, which are pivoted at $n$ near the upper ends of the uprights $a$, the acting end of each latch being long enough to project into approximate contact with the adjoining guide-rod—that is to say, close enough to prevent the ring's passing it without said latch being moved aside—while its other end is provided with a handle or knob $o$. In order to normally maintain the latch in operative position—that is to say, with its acting end close to the adjoining guide-rod—a plate-spring $p$ is provided, which takes against its under side, said plate-spring being secured upon a projection $q$ of the upright.

$r$ denotes a pin or lug for limiting the movement of the latch under actuation of the spring.

As the weight of a body when it falls into the net is adapted to force the latches to release the net and let it drop, I provide means for cushioning the fall of the net, which consist of spiral springs $s$, surrounding the guide-rods and surmounted by movable collars $t$, slidingly arranged on said guide-rods, said springs resting upon the projections $e$ of the uprights, it being observed upon a view of the drawings that the guide-rods are secured at their lower ends in the projections.

In order to limit the sagging of the net and to confine this sagging to the formation of a limited recess or hollow in the latter, in which the body may be directly received, I provide arms $u$, which are rigidly secured to the crossbar $g$ near each end thereof. These arms are preferably formed of steel, and they are worked through the end meshes of the net. They not only act to keep the net properly stretched in its forward portion, but are flexible enough so that when a body falls into the net, they coact with the springs $s$ to cushion the body when it drops.

Having thus fully described my invention, what I claim as new, and desire to secure by Letters Patent, is—

1. In a car-fender, the combination of a frame, an inclined net or other similar receptacle carried by said frame, the upper portion of said net being adapted to fall or drop, and a latch or latches normally sustaining said net in its inclined position in the frame, substantially as described.

2. In a car-fender, the combination of a frame, an inclined net or other similar receptacle carried by said frame, the upper portion of said net being adapted to fall or drop, a latch or latches normally sustaining said net in its inclined position in the frame, and cushioning means for said net, substantially as described.

3. In a car-fender, the combination of a frame, guiding means mounted therein, an inclined net or other similar receptacle carried by said frame, the upper portion of said net being connected to the guiding means, and a latch or latches normally sustaining said net in its inclined position in the frame, substantially as described.

4. In a car-fender, the combination of a frame, guiding means mounted therein, a net or other similar receptacle carried by said frame, said net being secured to the frame at its front end and having its rear portion elevated and connected to said guiding means, a latch or latches normally sustaining the elevated portion of said net, and cushioning means for the net arranged on said guiding means, substantially as described.

5. In a car-fender, the combination of a frame, guiding means mounted therein, a falling or dropping net or other similar receptacle carried by said frame, said net being secured to the frame at its front end and being connected to said guiding means at its other end, means for normally sustaining said net in its elevated position, and arms projecting rearwardly from the forward portion of said frame and engaging the front section of the net, substantially as described.

In testimony that I claim the foregoing I have hereunto set my hand this 23d day of March, 1900.

GEO. D. SMITH.

Witnesses:
JOHN W. STEWARD,
ALFRED GARTNER.